Nov. 12, 1935.  F. A. PARSONS  2,020,852

TRANSMISSION AND CONTROL MECHANISM

Filed Nov. 22, 1928   4 Sheets-Sheet 1

INVENTOR
Fred G. Parsons

Nov. 12, 1935.  F. A. PARSONS  2,020,852
TRANSMISSION AND CONTROL MECHANISM
Filed Nov. 22, 1923   4 Sheets-Sheet 4

Fig. 12

INVENTOR
Fred A. Parsons

Patented Nov. 12, 1935

2,020,852

UNITED STATES PATENT OFFICE 2,020,852

TRANSMISSION AND CONTROL MECHANISM

Fred A. Parsons, Milwaukee, Wis., assignor to Kearney & Trecker Corporation, West Allis, Wis.

Application November 22, 1928, Serial No. 321,250

39 Claims. (Cl. 90—21.5)

This invention relates to machine tools and more particularly to transmission and control mechanism therefor.

It is a purpose of the invention to provide an improved machine tool transmission which is in part hydraulic and in part mechanical.

Another purpose relates to an improved relationship between spindle and table transmissions of a milling machine and to an improved control mechanism for the various power trains.

Another purpose relates particularly to a machine tool table transmission in which the table rate may be varied by hydraulic devices in an improved manner, and to the control of such devices.

Another purpose relates to an improved hydraulic transmission providing means preventing the driven member from over-running or moving ahead of its driving train, particularly for certain types of machine tools where such over-running may exist in the normal or accidental operation of the machine, and might cause damage.

A further purpose is generally to simplify and improve the construction and operation of machine tools and of transmission and control mechanism therefor, and still other purposes will be apparent from this specification.

The invention consists in the combination and arrangement of parts as herein illustrated, described and claimed, and in such modifications of the structure illustrated as may be equivalent to the claims.

In the drawings, like reference characters have been applied to the same parts in each of the several views, of which.

Figure 1:
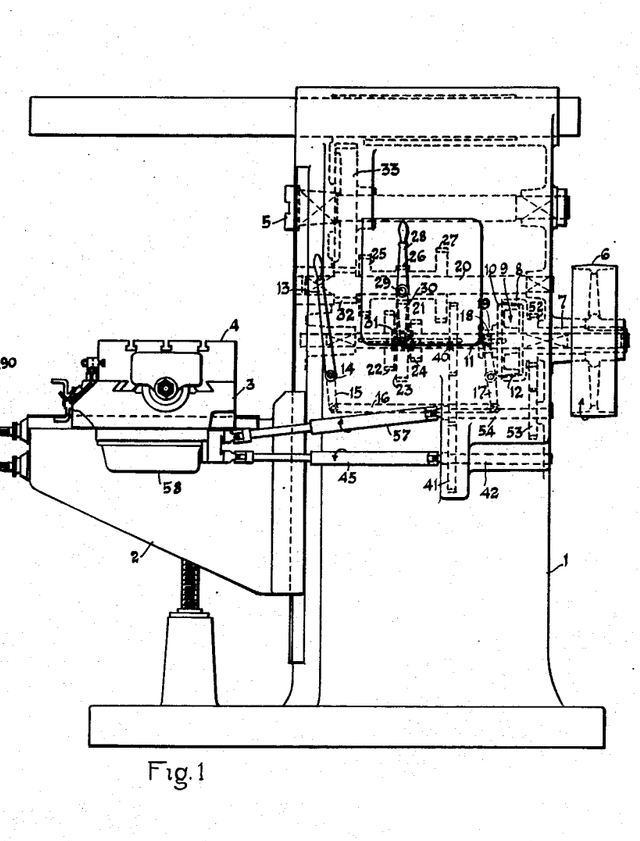
Fig. 1 is a right side elevation of a milling machine in which the invention is incorporated.
Figure 2:
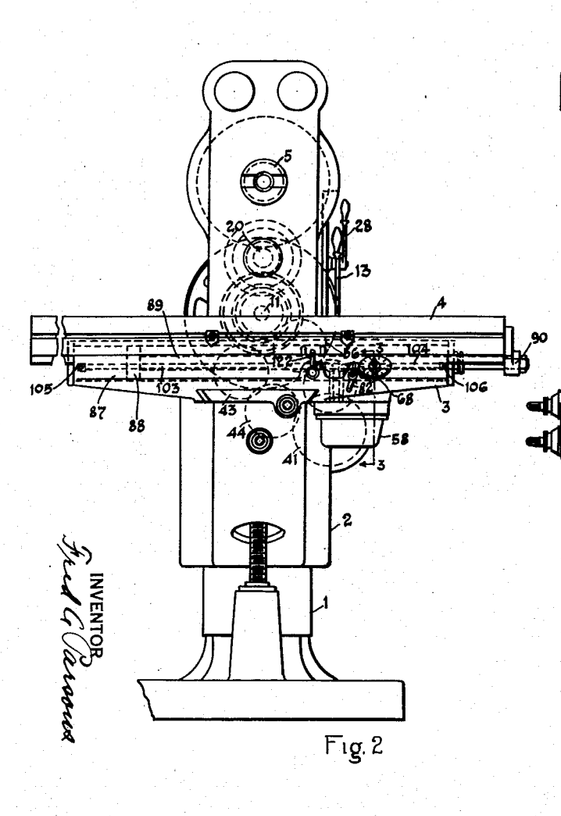
Fig. 2 is a front elevation of the same machine.

The milling machine includes a column or support 1, a knee or support 2 guided for vertical movement on column 1, a saddle or support 3 guided for movement on knee 2 in a direction toward and from column 1, and a table or work support 4 guided in saddle 3 for movement to right or left in Fig. 2. Rotatably mounted in column 1 is a tool spindle or tool support 5 for which transmission mechanism is provided as follows: A pulley 6 is fixed on a sleeve or member 7, also having fixed thereon a member 8 of a friction clutch generally denoted by numeral 9 and having movable member 10 slidably keyed on a shaft 11 for movement in the one direction to disengage complementary friction surfaces 12 on the members 8—10 and for movement in the other direction to engage such surfaces whereby shaft 11 will be driven from pulley 6.

The member 10 may be shifted by means of a hand lever 13 fixed on a shaft 14 upon which is also fixed a lever 15 connecting by means of a pivoted rod 16 with a pivoted lever 17 having a pivoted shoe 18 engaging an annular grove 19 in the hub of the member 10. Shaft 11 drives a shaft 20 through a rate changer generally denoted by the numeral 21 and consisting of different diametered gears 22—23—24 fixed together and slidably keyed on shaft 11 to be moved into engagement one at a time respectively with complementary gears 25—26—27 fixed on the shaft 20. To shift the gears 22—23—24 there is provided a hand lever 28 fixed on a shaft 29 on which is also fixed a lever 30 having a pivoted fork 31 engaging the faces of the gear 23. Fixed on shaft 20 is a pinion 32 engaging a gear 33 fixed on spindle 5.

Transmission mechanism is provided for the movement of table 4 including a feed pump of relatively small displacement generally denoted by the numeral 34, Figs. 3–12, and a rapid traverse pump of relatively large displacement generally denoted by numeral 35.

Figure 3:
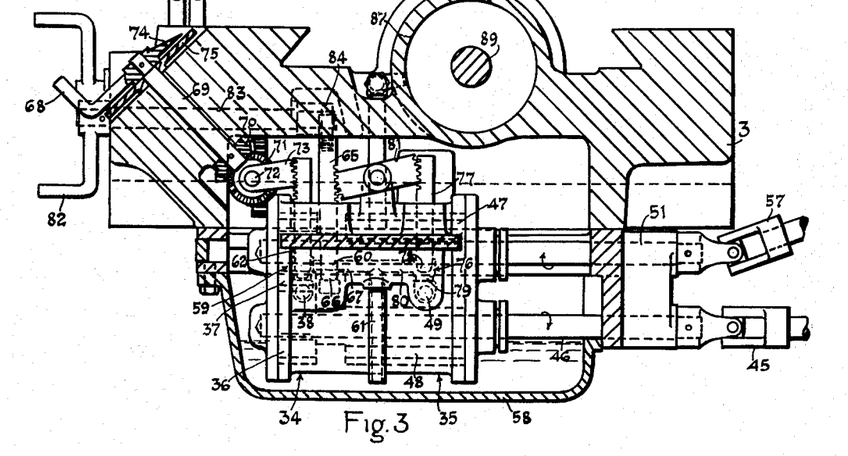
Fig. 3 is a partial vertical section taken along line 3—3 of Fig. 2 and enlarged.
Figure 4:
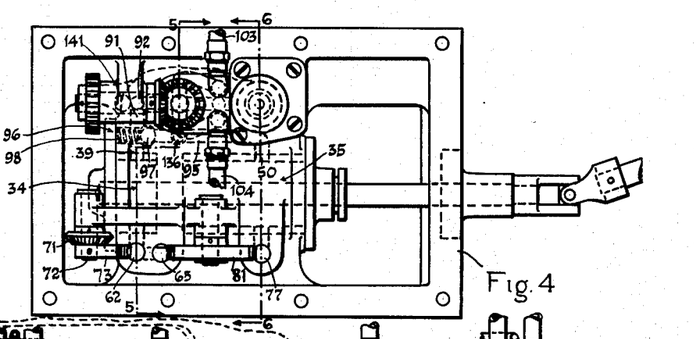
Fig. 4 is a plan view of the mechanism shown in the lower portion of Fig. 3.
Figure 5:
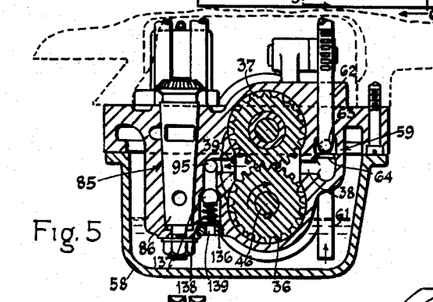
Fig. 5 is a vertical section along line 5—5 of Fig. 4.
Figure 6:
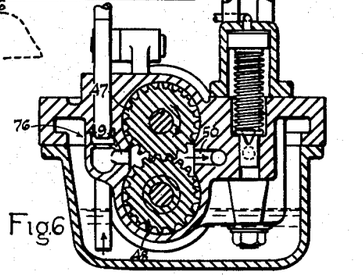
Fig. 6 is a vertical section along line 6—6 of Fig. 4.

Pump 34 may be of any suitable type but in this case consists of gears 36—37 meshed together within a substantially closed housing as shown particularly in Figs. 3–5, the housing providing an inlet port 38 and an outlet port 39.

Pump 34 is connected to be driven from the spindle transmission at a point between the clutch 9 and the rate changer 21 through a train consisting of a gear 40, Figs. 1–12, fixed on the shaft 11 and driving a gear 41 fixed on shaft 42, through idlers 43—44, Fig. 2. An extensible universal joint shaft of well known form generally denoted by the numeral 45 connects shaft 42 to drive pump shaft 46 upon which pump gear 36 is fixed, the joint shaft providing a connection between shafts 42—46 in any position of the movements of knee 2 and saddle 3.

The pump 35 may be of any suitable form but in this case consists of gears 47—48, Figs. 3-16-12, meshed within a substantially closed housing providing an inlet port 49 and an outlet port 50. Gear 47 is fixed on shaft 51 and gear 48 is supported for rotation on the shaft 46 which passes through the gear to reach pump 34. Shaft 51 is driven from the spindle transmission at a point between the clutch 9 and pulley 6 by means of a train including a gear 52 fixed on clutch member 8, a gear 53 fixed on shaft 54 and idler gear 56, Figs. 2-12, connecting the gears 52—53, the shafts 54—51 being connected by means of an extensible universal joint shaft of well known form generally denoted by numeral 57 whereby shaft 54 may drive shaft 51 in any position of knee 2 and saddle 3.

The pumps 34—35 are positioned within a hollow housing or casing generally denoted by numeral 58 and providing a fluid reservoir with which the inlet ports 38—49 each communicate. The inlet port 38 of the feed pump 34 communicates with the reservoir through a feed regulating throttle generally denoted by numeral 59, Figs. 3-5-12, and through a cut-off throttle generally denoted by numeral 60 and through suitable passageways connecting the throttles from a suction pipe 61. The feed regulating throttle 59 may be of any suitable form but in this case consists of a plunger 62 having a tapered end portion 63 adapted to restrict throttle opening 64 to a greater or less extent in accordance with the position of the plunger 62 whereby to determine the rate of flow of fluid through the pump 34 in accordance with the position of plunger 62. The cut-off throttle 60 consists of a plunger 65 having an end portion 66 adapted to completely close the channel 67 leading from the reservoir when plunger 65 is in the position shown in Fig. 3. Thus the fluid flow to pump 34 may be completely cut off by the throttle 60 or may be predetermined in accordance with the position of plunger 62 when throttle 60 is open.

Figure 12:
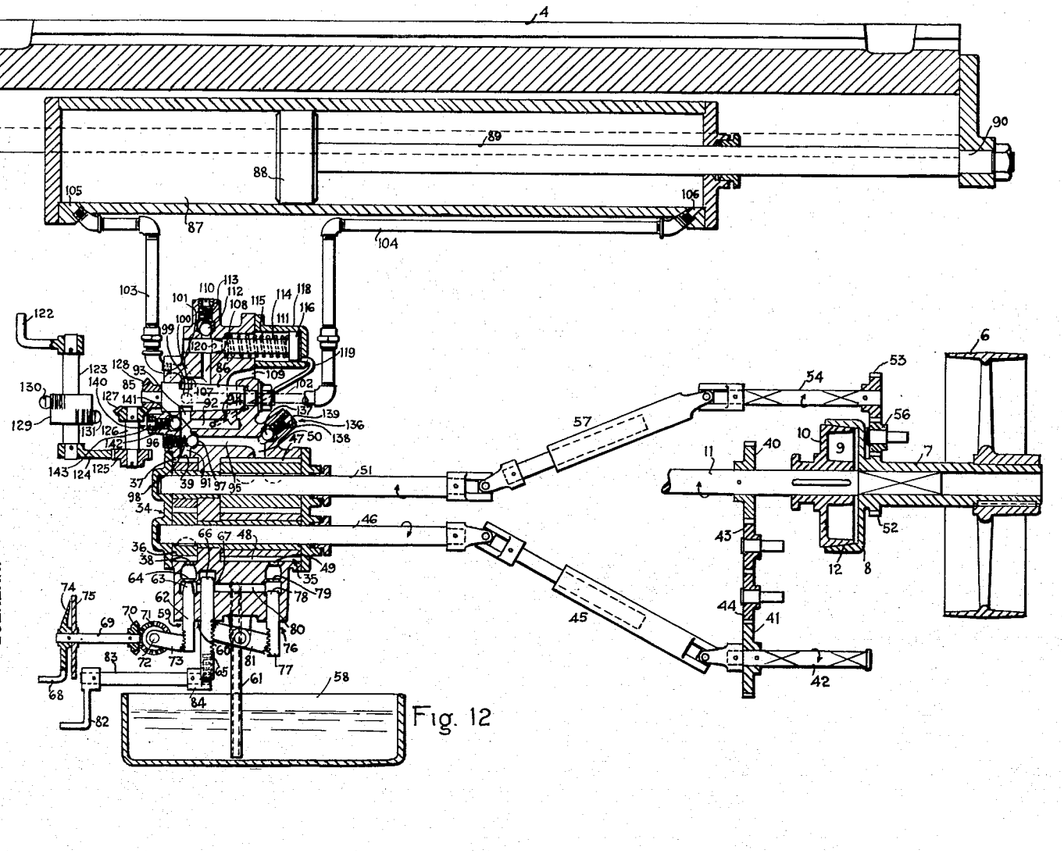
Fig. 12 shows a diagram of the table transmission and associated mechanism.

The position of throttle 59 may be manually regulated by the means of a lever 68, Figs. 2-3-12, fixed on a shaft 69 upon which is fixed a bevel gear 70 meshed with a gear 71, Figs. 3-4-12, fixed on a shaft 72 upon which is also fixed segment 73 engaging suitable rack teeth in the plunger 62. Fixed to move with lever 68 is a pointer or indicating member 74 adapted to indicate against a stationary dial or index member 75 the position of the plunger 62.

The inlet port 49 of the quick traverse pump 35 communicates with the fluid within reservoir 58 through a cut-off throttle generally denoted by the numeral 76, Figs. 3-6-12, consisting of a plunger 77 having an end portion 78 adapted as the plunger is shifted to open or completely close a throttle opening 79 within the channel 80 leading from the port 49 to the suction pipe 61.

The plungers 65—77 are connected for dependent action between throttles 60 and 76, by the means of a pivoted lever 81, Figs. 3-4, having segment teeth on the opposite ends respectively to engage the plungers 65—77 whereby either of the throttles is completely opened when the other is completely closed. The plungers may be manually moved by means of a hand lever 82, Figs. 3-7-12, fixed on a shaft 83 upon which is also fixed a segment 84 engaging suitable rack teeth in the extended end of plunger 65.

Figures 7, 8, 9, 9A, 9B, 10, 10A, 10B, 11:
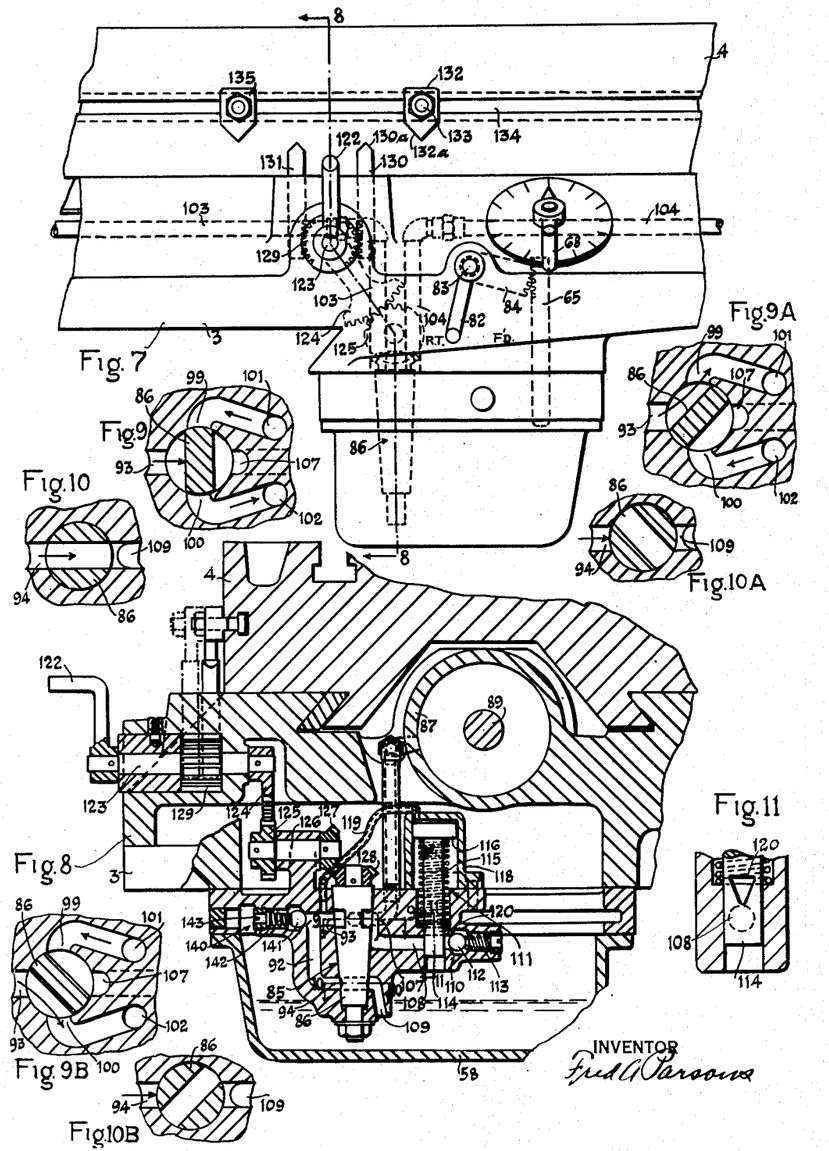
Fig. 7 is an enlarged portion of the front elevation shown in Fig. 2.
Fig. 8 is a vertical section along line 8—8 of Fig. 7.
Figs. 9–9A–9B, 10–10A–10B are partial sections showing different positions of a reverser valve.
Fig. 11 is a partial section showing a control plunger or throttle valve.

The output of each of the pumps 34—35 is led to a reverser valve generally denoted by the numeral 85, Figs. 5-7-8-12, which includes a rotatable stem 86 having cut away portions as particularly shown in Figs. 9-10, and from the reverser valve 85 through suitable channels to the one or the other end of a cylinder 87 fixed with saddle 3 and having a piston head 88 fixed with a piston rod 89 which is fixed at end 90 for movement with table 4, the communicating channels being as follows:

Outlet port 39 of pump 34 communicates with a channel 91, Figs. 4-12, leading into a channel 92, Figs. 4-8-12, having an outlet port 93, Figs. 8-9-12, adjacent an upper portion of valve stem 86, and an outlet port 94, Figs. 8-10-12, adjacent a lower portion of valve stem 86. The port 50 of pump 35 communicates with the channel 91, Figs. 4-12, through a channel 95 and a check valve generally denoted by the numeral 96 consisting of a ball 97 pressed by a spring 98, the arrangement permitting fluid to pass from pump 35 into channel 91 but preventing it from passing from channel 91 to the pump 35 for reasons which will be later explained. Thus the ports 93—94 adjacent valve stem 86 may be supplied from either pump 34—35. Adjacent the upper portion of valve stem 86 are ports 99—100, Figs. 9-12, communicating with passages 101—102 respectively communicating with pipes or channels 103—104, Figs. 2-7-12, which in turn communicate with openings 105—106 leading to end portions of cylinder 87 on opposite sides of piston 88 respectively. Adjacent the upper portion of valve stem 86 there is also a port 107, Figs. 8-9-12, communicating with a passage 108 leading to the reservoir 58 through throttle devices later described. Adjacent the lower portion of valve stem, there is a port communicating freely with reservoir 58 through passage 109, Figs. 8-10-12.

The arrangement is such that when valve stem 86 is in the positions shown in Figs. 9-10, the pressure ports of the pumps 34—35 communicate with channel 109 through channels 91—92 and port 94 through the valve stem to passage 108, the ports 99—100 leading to the cylinder being closed. When the valve stem 86 is in the position shown in Figs. 9a-10a, the pressure ports of the pumps communicate with the left end, Fig. 2, of the cylinder 87 through channels 91—92, valve ports 93—99, and channels 101—103, valve port 94 being closed as shown in Fig. 10a, the piston 88 and table 4 being thereby forced to the right in Fig. 2. Fluid in the right hand end of the cylinder is then forced out through channels 104—102 and valve ports 100—107 into channel 108 and the reservoir 58.

When the valve stem 86 is in the position shown in Figs. 9b-10b, the pressure ports of the pumps communicate with the right hand end, Fig. 2, of cylinder 87 through channels 91—92, valve ports 93—100 and channels 102—104, thereby moving the piston and table to the left, fluid from the left hand end of the cylinder being forced to the reservoir 58 through channels 103—101, valve ports 99—107, and channel 108.

The channel 108 communicates with the reservoir 58 through a spring valve or throttle generally denoted by the numeral 110, Figs. 8-12, and another valve or throttle generally denoted by numeral 111. Valve 110 provides a ball 112 pressed by a spring 113 whereby to maintain a predetermined back pressure against the escape of fluid from channel 108. Valve 111 may be of any suitable form but in this instance includes a plunger 114 pressed upwardly in Fig. 8 by means of a spring 115 and having fixed thereon a piston head 116 movable in a cylinder 118. A pipe or channel 119, Figs. 8-12, communicates from the pressure channel 92 to the upper end Fig. 8 of the cylinder 118 whereby to oppose spring 115 by means of fluid under pressure derived from the channel 92. The area of piston 116 is such that when any material pressure exists in the channel 92, plunger 114 will be moved down against the pressure of spring 115 to a position to bring an opening 120 in the plunger 114, Fig. 11, to a position relative to the outlet channel 108 such that the outlet channel is practically unrestricted, but if the pressure in channel 92 falls below a predetermined point, spring 115 will move plunger 114 to substantially close the outlet channel 108. It is obvious that the proportions of the spring 115 and piston head 116 may be of any desired relationship whereby any given fall of pressure in channel 92 may bring about any desired degree of opposition to table movement, and that suitably proportioning the form of the opening 120 with relation to the movement of the piston under the combined influence of the spring and fluid pressure may result in a variety of different degrees of opposition in accordance with a given range of forward pressures in channel 92.

The reverser valve 85 may be moved by means of a hand lever 122, Figs. 2-7-8-12, fixed on shaft 123 upon which is also fixed a segment 124 meshing with gear 125 on a shaft 126 which turns valve stem 86 through bevel gears 127—128. Valve 85 may also be moved by table dogs as follows: The shaft 123 has fixed thereon a pinion 129 engaging suitable rack teeth on plungers or trip pins 130—131 respectively positioned on opposite sides of the pinion. The arrangement is such that when lever 122 is moved to the left in Fig. 7, fluid will be applied to the end of cylinder 87 to move table 4 to the left in Fig. 7 and plunger 130 will be raised and plunger 131 lowered. A dog 132 adjustably fixed on the table by means of T bolt 133 and T slot 134 will thereafter during the course of table movement contact plunger 130 at a predetermined point in the table movement and force the plunger downwardly, thereby bringing lever 122 to a central position corresponding to the valve position shown in Figs. 9-10 to stop the table, there being complementary angular cam surfaces 130a—132a on the plunger and dog for this purpose. If lever 122 is oppositely moved for the movement of the table to the right in Fig. 7 this moves plunger 131 upwardly after which it may be contacted by a similar dog 135 to similarly stop the table.

In operation of the machine the feed pump 34 will be running if the spindle 5 is running. In such case either a feed or a rapid traverse of the table may be had according to the position of lever 82, whereby fluid is admitted to the one or the other pump. If the spindle 5 is not running only the rapid traverse pump 35 will be operative. The pump not in use will receive no fluid whereby it will consume very little power. If the lever 82 is positioned for the feed pump to be operative, the rate of table operation therefrom will depend upon the position of the feed control lever 68. The location of the feed control throttle 59 on the suction side of pump 34 is such that the rate of fluid pumped is substantially unaffected by the resistance against which the pump is working, the fluid being pressed through the throttle by atmospheric pressure, which being substantially constant will predetermine the rate of fluid flow and consequently the feed rate of table movement substantially in exact accordance with the position of the feed control lever 68 and substantially independently of variations in the resistance or load against which table 4 is operated.

In certain machine tools and particularly in milling machines, it may occur under certain conditions of operation, either intentional or accidental, that the table tends to over-run its transmission. Such action is sometimes very objectionable and it is partly to overcome it that the valve or throttle 111 has been included in the fluid outlet. The described arrangement is such that the fluid outlet is automatically restricted to maintain a predetermined pressure in channel 92. If there is a sufficient load resistance to table forward movement the fluid outlet is substantially unrestricted but under conditions such that the table would otherwise over-run the automatic restriction of the fluid outlet prevents such result, acting substantially in the manner of a table brake applied automatically in accordance with the direction relationship instantaneously existing between the cutting force and the driving force, whereby the brake is applied to prevent over-running of the table whenever both such forces are in the same direction and independently of the direction of table movement.

There are, in addition to prevention of considerable amounts of over-run, other advantages to providing back pressure to the motor. Such back pressure materially reduces the liability to chatter and if chatter or irregular movement can take place at all, the amount of such movement is materially reduced.

The valve or throttle 113 restricts the fluid outlet to provide a predetermined relatively small back pressure under conditions of operation and independently of the operation of valve 111 as for instance when considerable pressure exists in channel 98. Such back pressure tends to reduce or eliminate vibration or chatter of the table and piston. If desired the functions of both valves 111—113 may be combined in a single valve similar to 111, properly proportioned.

When reverser valve 85 is positioned to stop the table, as in Figs. 9-10, it will lock the table positively by closing the fluid channels leading to each end of the cylinder, the valve stem being formed for such operation as shown in Fig. 9. In such case if either pump 34—35 is operating, the fluid therefrom is by-passed through channel 60 92 and ports 94—109 and flows freely into reservoir 58, thereby avoiding all back pressure on the pumps when the table is stationary.

Relief valves are provided to protect the transmission mechanism from damage caused by overloading as follows: A quick traverse pressure relief valve generally denoted by the numeral 136 Figs. 4-5-12, is positioned to pass fluid from the channel 95 when the fluid pressure therein exceeds a predetermined relatively low value. Valve 136 includes a ball 137 pressed by a spring 138 which, when overcome by the fluid pressure against the ball permits escape of fluid past the ball and into reservoir 58 through an opening 139. A feed pressure relief valve, generally denoted by the numeral 140, Figs. 4-8-12, is positioned to pass fluid from channel 82 when the pressure therein exceeds a predetermined relatively high value. Valve 140 includes a ball 141 pressed by a spring 142, which when overcome by the fluid pressure permits escape of fluid past the ball and into reservoir 58 through an opening 143. The valve 136 being positioned between the check valve 96, Fig. 4, and the quick traverse pump 35, is not operable from the pressure of the feed pump 34 whereby the quick traverse pressure may be relieved at a relatively low point, which is desirable because of its relatively fast table rate, and without influencing the feed relief pressure. There is also another reason for the position of check valve 96 relative to the feed and rapid traverse channels. In the arrangement here shown, the check valve 96 prevents the quick traverse pump from continuously operating against a feed pressure during a feeding movement which would greatly increase friction and fluid leakage and consequent power loss.

It will be apparent that the reverser movements and also the change from feed to rapid traverse are adapted to be readily controlled automatically in accordance with the table movement but since a variety of suitable control devices for such purpose are well known they are not shown here.

In the foregoing description the matter of preventing over-run has been presented mainly in connection with table trains. It will be obvious, however, that corresponding principles may be applied to prevent the over-run of other trains in a machine tool, as, for instance, a spindle train, and with attendant advantages such as the reduction or elimination of chatter.

What is claimed is:

1. In a machine tool the combination of a base, a tool support and a work support each supported from said base and adapted for relative bodily movement, transmission mechanism for said relative movement including a fluid motor, a power actuated fluid pump, a fluid channel connecting said pump and motor, a fluid reservoir, an inlet channel from said pump to said reservoir, an outlet channel from said motor to said reservoir, a throttle in said inlet channel and shiftable to change the rate of fluid delivery to said pump, a shiftable throttle in said outlet channel, and means responsive to an increase of the fluid pressure in said connecting channel to increase the opening of the last mentioned throttle.

2. In a machine tool the combination of a base, a tool support and a work support each supported from said base and adapted for relative bodily movement, transmission mechanism for said relative movement including a fluid motor, a plurality of pumps each connectible to actuate said motor, a fluid reservoir, channels communicating from said reservoir to the inlet ports of said pumps respectively, shiftable throttles respectively associated with different of said channels, and means for shifting said throttles to determine the rate of actuation of said motor.

3. In a machine tool the combination of a base, a tool support and a work support each supported from said base and adapted for relative bodily movement, transmission mechanism for said relative movement including a fluid motor, a feed pump and a rapid traverse pump each connectible for operation of said motor, a fluid reservoir, channels respectively communicating from the inlet ports of different of said pumps to said reservoir, throttles respectively associated with different of said channels and each shiftable to open or to close their respective channels, and another throttle in the channel of said feed pump and adjustable to determine the rate of fluid flow thereto.

4. In a machine tool the combination of a base, a tool support and work support each supported from said base and adapted for relative bodily movement, transmission mechanism for said relative movement including a fluid motor, a plurality of pumps each connectible to actuate said motor, a fluid reservoir, channels communicating from said reservoir to the inlet ports of said pumps respectively, shiftable throttles respectively for different of said channels, and means for simultaneously shifting said throttles to determine the alternative actuation of said motor from the one or the other of said pumps.

5. In a machine tool the combination of a base, a tool support and a work support each supported from said base and adapted for relative bodily movement, transmission mechanism for said relative movement including a fluid motor, a feed pump and a quick traverse pump each connected to actuate said motor, and means for preventing said quick traverse pump from actuating said motor and including a throttle adapted to restrict fluid flow to the inlet port thereof.

6. In a machine tool the combination of a base, a tool support and a work support each supported from said base and adapted for relative bodily movement, transmission mechanism for said relative movement including a fluid motor, a feed pump and a quick traverse pump each having fluid transmitting channel connections with said motor, means for restricting the flow of fluid to the inlet port of said quick traverse pump, and means associated with said channel connections to prevent fluid pressure from said feed pump reacting on said quick traverse pump when said restricting means is operative.

7. In a machine tool the combination of a base, a tool support and a work support each supported from said base and adapted for relative bodily movement, transmission mechanism for said relative movement including a fluid motor, a fluid pump, a fluid reservoir, an inlet channel from said reservoir, a channel connecting said pump and motor, an outlet channel from said motor, a throttle in said outlet channel and shiftable to change the back pressure on said motor, and means for shifting said throttle to increase said back pressure when the fluid pressure in said connecting channel is decreased and vice versa.

8. In a machine tool the combination of a base, a tool support and a work support each supported from said base and adapted for relative bodily movement, and transmission and control mechanism for said relative movement including a fluid motor, a pump, a fluid reservoir, an inlet channel from said reservoir to said pump, a channel connecting said pump and motor, an outlet channel from said motor to said reservoir, a throttle in said outlet channel and shiftable to restrict the flow of fluid therethrough, means for shifting said throttle to increase the restriction of said outlet channel when the fluid pressure within said connecting channel falls, and another throttle associated with said outlet channel and adapted to control fluid flow therethrough to maintain pressure therein above a predetermined minimum value.

9. In a milling machine having a rotatable tool spindle and a relatively movable work support, the combination of a transmission for said tool spindle including a power source, a motion interrupting clutch and said spindle in the order recited, a feed pump and a quick traverse pump each connected to be driven from said transmission at points on opposite sides of said clutch respectively, a power train for the movement of said support including a fluid motor operable from said pumps, a fluid reservoir, inlet channels respectively connecting said reservoir with the different of said pumps, throttles respectively in different of said inlet channels, and means for operating said throttles to control the rate of actuation of said motor.

10. In a machine tool the combination of a base, a tool support and a work support each supported from said base and adapted for relative bodily movement, a transmission for said relative movement including a plurality of power operated pumps, a fluid motor connected with said support, a fluid reservoir, inlet channels connecting said reservoir with said pumps respectively, closed channels connecting said pumps with said motor, an outlet channel connecting said motor and reservoir, throttles respectively in different of said inlet channels, means for operating said throttles to control the speed of said motor, a throttle in said outlet channel, and means to shift the last mentioned throttle in accordance with fluid pressure in said closed channel.

11. In a machine tool the combination of a base, a tool support and a work support each supported from said base and adapted for relative bodily movement, a transmission for said relative movement including a power operated feed pump and a power operated quick traverse pump, a fluid motor connected with said support, a reservoir, inlet channels connecting said reservoir with said pumps respectively, closed channels connecting said pumps with said motor, an outlet channel connecting said motor and reservoir, throttles respectively in different of said inlet channels and operable to substantially close either of said inlet channels whereby to actuate said motor only from the pump associated with the other inlet channel, another throttle in the inlet channel of said feed pump and operable to adjust the flow of fluid thereto, a throttle in said outlet channel, and means to shift the last mentioned throttle to restrict said outlet channel when fluid pressure in said closed channel falls below a predetermined value.

12. In a machine tool the combination of a base, a tool support and a work support each supported from said base and adapted for relative bodily movement, a transmission and control mechanism for said relative movement including a fluid pump, a reversible fluid motor, channels connecting said pump and motor including a motor reversing means, means for operating said reversing means to reverse said motor, a source of fluid supply, a channel connecting said source with the inlet port of said pump, a shiftable throttle associated with said channel for predetermining the rate of fluid flow to said pump, shifting means for said throttle and operable independently of said means for operating said reversing means, and rate indicating means movable from said shifting means, whereby to control the rate and direction of motor actuation.

13. In a milling machine the combination of a rotatable spindle, a movable support, a spindle train including a power source, a motion interrupting clutch, a rate changer and said spindle in the order recited, a feed pump actuated from said spindle train at a point between said clutch and rate changer, a quick traverse pump actuated from said spindle train at a point between said clutch and power source, a motor connected with said support and simultaneously connected with both said pumps, inlet channels respectively for the different pumps, throttles respectively in the different channels, and means for operating said throttles to determine the actuation of said motor from the one or the other of said pumps.

14. In a milling machine the combination of a rotatable spindle, a movable support, a spindle train including a power source, a motion interrupting clutch, a rate changer and said spindle in the order recited, a feed pump actuated from said spindle train at a point between said clutch and rate changer, a quick traverse pump actuated from said spindle train at a point between said clutch and power source, a motor, a fluid reservoir, channels simultaneously connecting both said pumps with said motor, a plurality of inlet channels respectively from the different pumps to said reservoir, a plurality of throttles respectively in the different inlet channels and operable to determine which of said pumps shall actuate said motor, and another throttle in the inlet channel of said feed pump and operable to control the rate of said motor when said motor is actuated from said feed pump.

15. In a milling machine the combination of a rotatable spindle, a movable support, a spindle train including a power source, a motion interrupting clutch, a rate changer and said spindle in the order recited, a feed and a quick traverse pump respectively driven from said spindle train at different points adjacent said clutch but separated thereby, a motor connected with said support, a reservoir, channels simultaneously connecting both said pumps with said motor, inlet channels respectively from different of said pumps to said reservoir, an outlet channel from said motor to said reservoir, throttle devices associated with said inlet channels determinative of which of said pumps shall actuate said motor, a throttle associated with the inlet channel of said feed pump for determining the rate of actuation of said motor therefrom, and another throttle associated with said outlet channel and shiftable to restrict said outlet channel in accordance with the fluid pressure in said connecting channel.

16. In a milling machine the combination of a rotary spindle, a movable support, a spindle train including a power source, a rate changer and said spindle in the order recited, a pump driven from said spindle train at a point between said power source and said rate changer, a fluid motor connected with said support, a channel connecting said pump and motor, a fluid reservoir, an inlet channel from said reservoir, an outlet channel from said motor, means shiftable to restrict said outlet channel, and means controlling said restricting means to increase said restriction in accordance with reduction in the fluid pressure in said connecting channel, whereby to restrain said motor from over-running said pump.

17. In a machine tool the combination of a base, a tool support and a work support each supported from said base and one of which is adapted for bodily movement, a power train for movement of said movable support including a power source, a reverser, and said movable support in the order recited, said train also including rate change means, means operable to restrain said movable support against over-running said train, and means controlling the operation of said restraining means to reduce the effect thereof in accordance with an increase in the power delivered through a portion of said train positioned between said power source and said reverser.

18. In a milling machine the combination of a rotatable tool spindle, a work support movable in a path transverse to the axis of said spindle, a spindle train including a power source, a main clutch and said spindle in the order recited, a train for movement of said work support and driven from said spindle train through said main clutch, a device for preventing said support from over-running said support train, and means automatically controlling said device to reduce the effect thereof in accordance with an increase in the amount of power transmitted through said support train.

19. In a milling machine the combination of a rotatable tool spindle, a work support reciprocable in a path transverse to the axis of said spindle, a spindle train including a power source, a rate changer and said spindle in the order recited, a train for movement of said work support and driven from said spindle train to exclude said rate changer and including in the order recited a drive shaft, a reverser and said support, a device for preventing said support from over-running said support train in either direction of support movement, and means automatically controlling said device in accordance with the power transmitted through said shaft and independently of the position of said reverser.

20. In a milling machine the combination of a rotatable tool spindle, a work support movable in a path transverse to the axis of said spindle, a spindle train including a power source, a main clutch and said spindle in the order recited, a support train driven from said spindle train through said main clutch and including a constant displacement positive delivery fluid pump and a fluid operable motor, a fluid reservoir, a channel connecting said reservoir with the inlet port of said pump, and means for controlling the rate of movement of said support including a throttle device associated with said channel and adjustable to determine the volume of fluid received by said pump during a given time interval.

21. In a milling machine the combination of a rotatable tool spindle, a work support reciprocable in a path transverse to the axis of said spindle, a spindle train including a rate changer, a support train driven from said spindle train to exclude said rate changer and including in the order recited a rotatable drive shaft, a constant displacement positive delivery fluid pump, a reverser valve, a fluid operable motor and said support, said support train providing a substantially closed passageway connecting said pump and motor through said reverser valve, a reservoir, an inlet channel from said reservoir to an inlet port of said pump, a return channel for returning fluid from said motor to said reservoir, means for controlling the rate of movement of said support including a throttle device associated with said inlet channel and adjustable to determine the volume of fluid received by said pump during one revolution of said drive shaft, a device associated with said return channel for preventing said support from over-running said support train, and means automatically controlling the operation of said device in accordance with the fluid pressure in a portion of said closed passageway positioned between said pump and said reverser valve.

22. In a machine tool the combination of a base, a tool support and a work support each supported from said base and one of which is movable relative to the other, a transmission for said movable support including a fluid operable motor, a feed rate pump having a relatively small displacement, a quick traverse rate pump having a relatively large displacement and channels connectible between each of said pumps and said motor, a reservoir, channels connecting said reservoir to supply said pumps, including an inlet channel having a portion individual to said feed rate pump; and control means for said transmission for altering the rate of movement of said support including means alternatively operable for effecting a feed rate or a quick traverse rate of said motor, and means for altering said feed rate, the last mentioned means including a throttle associated with said inlet channel portion and adjustable to determine the volume of fluid delivered to said feed pump during a given time interval.

23. In a milling machine the combination of a rotatable tool spindle, a work support reciprocable in a path transverse to the axis of said spindle, a spindle train including a power source, a main clutch and said spindle in the order recited, a transmission for said support including a reversibly fluid operable motor, a feed rate pump having a relatively small displacement and driven from said spindle train through said main clutch, a rapid traverse rate pump having relatively large displacement and driven from said spindle train from a point between said power source and main clutch, a reverser valve for reversing the direction of operation of said motor, and passageways connectible between said pumps and said motor through said reverser valve, a reservoir, channels connecting said reservoir to supply said pumps including an inlet channel having a portion individual to said feed rate pump, control means for said transmission for altering the rate of said motor including means alternatively operable for a quick traverse rate or for a feed rate and means for altering said feed rate including a throttle associated with said inlet channel portion and adjustable to change the volume of fluid delivered to said feed pump during a given time interval, a channel for return of fluid from said motor to said reservoir, a device associated with the last mentioned channel and adapted to prevent said support from over-running its transmission, and means automatically controlling said device in accordance with the fluid pressure in a portion of said passageways positioned between said pumps and said reverser valve.

24. In a milling machine, the combination of a rotatable tool spindle, a support for said spindle, a work support, one of said supports being movable relative to the other support in a direction transverse to the axis of said tool spindle, a power train for said spindle including a power source associated with said milling machine, a transmission for movement of said movable support including mechanism alternatively operable for feed and quick traverse rates of support movement, a device operable to restrain said movable support from overrunning said transmission, and an operating mechanism for said device and operable at least during support movement at said feed rate in accordance with the power required for movement of said movable support.

25. In a milling machine, the combination of a rotatable tool spindle, a support for said spindle, a work support, one of said supports being movable relative to the other support in a direction transverse to the axis of said tool spindle, a power train for said spindle including a power source associated with said milling machine and a rate changer, a transmission for movement of said movable support including a pump actuated from said power source to exclude said rate changer, a fluid operable motor and a fluid passage connecting said pump and motor, a reservoir for fluid, a channel connecting said reservoir and the inlet port of said pump, and a device for controlling the rate of movement of said movable support including an adjustable throttle associated with said channel whereby to selectively restrict the fluid delivered to said pump.

26. In a milling machine, the combination of a rotatable tool spindle, a support for said spindle, a work support, one of said supports being movable relative to the other support in a direction transverse to the axis of said tool spindle, a power train for said spindle including a power source associated with said milling machine, and a circulatory fluid system for movement of said movable support including a pump driven from said power source, a fluid reservoir, a first passage connecting said reservoir and the inlet valve of said pump, a fluid operable motor, a second passage connecting said pump and motor, a third passage connecting the outlet port of said motor to return fluid to said reservoir, control means including an adjustable throttle associated with said first passage and adapted to change the volume of fluid delivered to said pump, means preventing said support from overrunning including an adjustable throttle associated with said third passage and adapted to establish a back pressure on said motor, and automatic control means for the last mentioned throttle and operable in accordance with fluid pressure within said second passage.

27. In a milling machine, the combination of a rotatable tool spindle, a support for said spindle, a work support, one of said supports being movable relative to the other support in a direction transverse to the axis of said tool spindle, a power train for said spindle including a power source associated with said milling machine and a spindle rate changer, a transmission for movement of said movable support, said transmission being driven from said spindle train to exclude said rate changer and alternatively operable for feed and quick traverse rates of support movement, a portion of said transmission including a pump and a motor actuated from said pump, a passage connecting said reservoir with the inlet port of said pump, an adjustable throttle associated with said passage and adapted to change the volume of fluid delivered to said pump, control means for said alternative operation at feed or quick traverse rates, and other control means operable independently of the first mentioned control means for the adjustment of said throttle.

28. In a milling machine, the combination of a rotatable tool spindle, a support for said spindle, a work support, one of said supports being movable relative to the other support in a direction transverse to the axis of said tool spindle, a power train for said spindle including a power source associated with said milling machine, a transmission for movement of said movable support including a fluid operable motor, a feed pump having relatively small displacement, a quick traverse pump, each of said pumps being operable to drive said motor, a reservoir for supply of fluid to each of said pumps, a channel connecting said reservoir with the inlet port of said feed pump, an adjustable throttle associated with said channel and adapted to change the volume of fluid delivered to said feed pump whereby to change the feed rate of said movable support, a passage connecting the outlet port of said motor with said reservoir, a second adjustable throttle associated with said passage; and control means including manually operable means for alternatively rendering said quick traverse pump operative and inoperative on said motor, manually operable means for adjusting the first mentioned throttle, and automatic means for adjusting said second throttle in accordance with the pressure of fluid delivered to said motor.

29. In a milling machine, the combination of a rotatable spindle, a movable support, a spindle train including a power source, a motion interrupting clutch, a rate changer and said spindle in the order recited, a feed pump actuated from said spindle train at a point between said clutch and rate changer, a quick traverse pump actuated from said spindle train at a point between said clutch and power source, a motor, a fluid reservoir, channels simultaneously connecting both said pumps with said motor, a plurality of inlet channels respectively from the different pumps to said reservoir, an adjustable throttle associated with the inlet channel of said feed pump and adapted to control the volume of fluid delivered to said pump, a passage connecting the outlet port of said motor with said reservoir, an adjustable member associated with said passage and adapted to control the back pressure on said motor; and control means including a device connected for movement in accordance with the adjustment of said throttle and adapted to indicate the result of different adjustments thereof, and a device automatically operative to adjust said member in accordance with the pressure of fluid delivered to said motor.

30. In a milling machine the combination of a rotatable tool spindle, a support for said spindle, a work support movable relative to said spindle support in a direction transverse to the spindle axis, a transmission for said tool spindle including a power source, a spindle rate changer and said spindle in the order recited, a feed pump and a quick traverse pump each connected to be driven from said transmission to be unaffected by said rate changer, a power train for the movement of said support including a fluid motor operable from said pump, a fluid reservoir, inlet channels respectively connecting said reservoir with the respective pumps, an adjustable throttle in the inlet channel of said feed pump and adapted to control the volume of fluid delivered thereto, and other control means operative independently of said adjusted throttle to effect an alternative feed or quick traverse volume of fluid from said pumps to said motor.

31. In a machine tool the combination of a base, a rotatably movable spindle and a slidably movable support each supported from said base, a transmission for one of said movements including a fluid pump, a fluid motor and a channel connecting said motor to receive fluid delivered from said pump, an outlet channel from said motor, and means for establishing back pressure in said outlet channel to prevent the driven portion of said transmission from over-running the driving portion thereof and including automatic means adapted to increase said back pressure when the fluid pressure in said connecting channel is decreased and vice versa.

32. In a machine tool the combination of a base, a rotatably movable spindle and a slidably movable support each supported from said base, transmission mechanism for one of said movements including a fluid pump, a reverser valve, a fluid motor connected with said support, a channel connecting said pump to said motor through said reverser valve, an outlet channel from said motor, and means for establishing back pressure in said outlet channel including a shiftable throttle, and means for shifting said throttle in accordance with the fluid pressure in the portion of said connecting channel between said pump and said reverser valve and in a direction to decrease the throttle opening as pressure in said channel portion is decreased.

33. In a machine tool the combination of a base, a tool support and a work support each supported from said base and adapted for relative bodily movement, transmission mechanism for said relative movement including a fluid motor, a power actuated constant speed fluid pump, a channel connecting said pump and said motor, a fluid reservoir, an outlet channel from said motor to said reservoir, an inlet channel from said reservoir to said pump and including a throttle shiftable to different positions to provide a variety of rates of fluid delivery to said pump, the channel portion between said throttle and pump providing a closed vacuum chamber, hand operable means for shifting said throttle selectively to any of said different positions, and another shiftable throttle in said outlet channel for establishing back pressure on said motor.

34. In a machine tool the combination of a base, a tool support and a work support each supported from said base and adapted for relative bodily movement, a transmission for said relative movement including a plurality of power operated pumps, a fluid motor operable from fluid pressure furnished by said pumps, an outlet channel for said motor, and means associated with said outlet channel and adapted to restrict said outlet channel when said fluid pressure is decreased and vice versa.

35. In a machine tool the combination of a base, a rotatably movable spindle and a movable support member each supported from said base, a transmission and control mechanism for one of said movements including a fluid pump, a fluid motor operable from said pump, a source of fluid supply, a channel connecting said source with the inlet port of said pump, a shiftable throttle associated with said channel for controlling the rate of fluid flow to said pump, the channel portion between said throttle and pump providing a closed vacuum chamber, shifting means for said throttle, and means movable from said shifting means for indicating the position of said throttle; whereby the speed of said motor may be selectively predetermined.

36. In a machine tool, the combination of a base, a tool support and a work support each supported from said base, a transmission for actuation of one of said supports including a fluid pump, a fluid operable motor, a channel from said pump to said motor, and an outlet channel from said motor, a throttle shiftable to change the back pressure in said outlet channel, and means responsive to fluid pressure changes to change the opening of said throttle in accordance with the fluid pressure in one of said channels.

37. In a machine tool, the combination of a base, a tool support and a work support each supported from said base, a transmission for actuation of one of said supports including a fluid pump, a fluid operable motor, a channel connecting said pump and motor, and an outlet channel from said motor, a device shiftable for controlling the back pressure in said outlet channel, and means responsive to fluid pressure changes to change the opening of said device in accordance with the fluid pressure in one of said channels.

38. In a milling machine, the combination of a rotatable tool spindle, a work support movable in a path transverse to the axis of said spindle, a spindle train including a power source and a rate changer, a transmission for movement of said work support including a fluid pump driven from said source to exclude said rate changer, a fluid operable motor, a channel from said pump to said motor, and an outlet channel from said motor, a throttle shiftable to change the back pressure in said outlet channel, and means responsive to fluid pressure changes to change the opening of said throttle in accordance with the fluid pressure in one of said channels.

39. In a machine tool the combination of a base, a tool support and a work support each supported from said base and adapted for relative bodily movement, transmission mechanism for said relative movement including a fluid motor, a power actuated constant speed pump, a reservoir for fluid, a channel connecting said pump with said reservoir and including a throttle shiftable to different positions to provide a variety of rates of fluid delivery to said pump, the channel portion between said throttle and pump providing a closed vacuum chamber, and hand operable means for shifting said throttle selectively to any of said different positions; whereby to selectively predetermine the rate of said relative movement.

FRED A. PARSONS.